J. H. JONES & R. EMERSON.
Harvester-Rake.

No. 222,589.   Patented Dec. 16, 1879.

WITNESSES
Wm A. Skinkle
Wm T. Kilgrove

INVENTORS
J. Herva Jones.
Ralph Emerson.

By their Attorneys
Baldwin, Hopkins & Peyton.

J. H. JONES & R. EMERSON.
Harvester-Rake.

No. 222,589. Patented Dec. 16, 1879.

WITNESSES

INVENTORS
J. Herva. Jones,
Ralph Emerson,
By their Attorneys

UNITED STATES PATENT OFFICE.

J. HERVA JONES AND RALPH EMERSON, OF ROCKFORD, ILL., ASSIGNORS TO SAID RALPH EMERSON AND WILLIAM A. TALCOTT, OF SAME PLACE.

IMPROVEMENT IN HARVESTER-RAKES.

Specification forming part of Letters Patent No. 222,589, dated December 16, 1879; application filed August 30, 1879.

*To all whom it may concern:*

Be it known that we, J. HERVA JONES and RALPH EMERSON, both of Rockford, in the county of Winnebago and State of Illinois, have invented certain new and useful Improvements in Harvester-Rakes, of which the following is a specification.

Our invention chiefly relates to improvements in that class of rakes in which rising-and-falling radial rake and reel arms are employed, resembling in some respects improvements represented in sundry Letters Patent of the United States heretofore granted for inventions made by John Barnes. Among the said Barnes patents may be mentioned that of December 15, 1874, No. 157,672. A harvester-rake of this type is also shown and described in an application for Letters Patent of J. Herva Jones, filed July 28, 1879.

The object of the first part of our invention is to give to the rake the proper movements to cause it to remove the cut grain from the platform in sweeping across or over and upon it, and then to rise and pass round clear of the machine and the driver in his seat thereon to the point at which the rake descends to the platform to repeat the raking operation, without the employment of a cam or toothed gearing of any kind beyond that required to impart rotary movement to the rake; and under this head our improvements consist—

First, in the combination of a revolving rake-support, such as a disk or crown-wheel, a bent or crooked rake-post, or an attachment or extension thereof, projecting inward or extending in a general direction toward the cutting apparatus and platform side of the machine, a rake-arm hinged to the crown-wheel or revolving rake-support near its edge or remote from its center of revolution, and playing vertically about its hinge, and a compensating connection between the rake-arm and said bent post or extension thereof, which connection is self-adjusting lengthwise, as well as flexible or transversely yielding, to accommodate variations in the distance between the points of its attachment to the rake-post and to the rake-arm, and permit of variations in the altitude or vertical positions of the rake, the said compensating connection consisting of a pitman rod or link, a turning support or collar on the rake-post, to which support the pitman is jointed, a swinging bracket pivoted on the rake-arm and moving at, or about at, a right angle to the plane of movement of the rake-arm about its jointed connection with the crown-wheel or revolving disk, and a duplex-joint or doubly-flexing connection between the pitman and the swinging bracket, whereby at the proper time the rake is caused by gravity to descend, and when about to sweep the platform to rest upon and be supported by the crown-wheel alone and revolve about its center only while removing the cut grain, and then to revolve in a differential path or about both centers (the crown-wheel axis and the bent rake-post) and rise and move round again to the starting-point.

The object of the next part of our invention is to render the rake adjustable, so as to strike into the grain sooner or later, or descend, at the beginning of its action, closer to or more in advance of the finger-beam; and under this head our improvements consist—

Second, in the combination of the rake-carrying crown-wheel or revolving support, the rake-post bent or crooked, or having an extension or attachment bent or crooked, inward or toward the platform, the rake-arm jointed at its heel to the crown-wheel remote from its center, the flexing compensating connection between the rake-arm and the bent post or extension thereof, and means for adjusting the pitman portion of said compensating connection with the swinging bracket portion thereof in or out from the rake-arm, or nearer to or farther from the pivot about which said bracket swings on the rake-arm, whereby the length of the connection between the rake-arm and post may be varied to cause the rake to descend sooner or later, or more or less in advance of the finger-beam, without impairing the compensative functions of the connection.

Third, in the combination of the rake-arm hinged to the crown-wheel, a swinging or pivoted bracket on the rake-arm, a pivoted eye-coupling or socket-piece rocking on the swinging bracket and moving, when in play, substantially at a right angle to the direction of movement or plane in which said bracket swings, and provided with two or more eyes or sockets, and a link, rod, or pitman adapted to be removably fitted at one end in any one of the eyes or sockets, and jointed at its opposite end to a bent or crooked rake-post, or to an extension or attachment thereof, so as to turn about it eccentrically to the crown-wheel.

The object of the next part of our invention is to insure the contact of the rake-teeth with the platform throughout the sweep of the rake in removing the cut grain, instead of depending wholly upon gravity, which would answer only measurably to keep the rake down to its work; and under this head our improvements consist—

Fourth, in the combination of the crown-wheel or revolving rake-support, the rake-post, or an extension or attachment thereof, bent or crooked toward the platform, the pitman or equivalent connection, turning about said rake-post, or extension or attachment thereof, a swinging bracket on the rake-arm, to which the pitman is jointed, and the rake-arm thus connected with the rake-post eccentrically to the crown-wheel, and a contractive spring secured at its opposite ends to said bracket, and at or near the heel end of the rake-post, whereby a constant tendency is exerted by the spring to rock the bracket inward, and thus lengthen the connection between the rake-post and rake-head, and so insure a clean sweep of the platform by the rake when in action.

The object of the next part of our invention is to provide a combined reel and rake in which there is employed no cam and no toothed gearing of any kind other than the gearing required simply to impart the requisite rotary motion to the crown-wheel or like support for the rake and reel arms; and under this head our improvements consist—

Fifth, in the combination of a crown-wheel or revolving support at the inner front corner of the platform or over the heel of the finger-beam, a series of rake and reel arms hinged to said crown-wheel remote from its center, a rake-post about which the crown-wheel revolves, and which, above said wheel, is bent or crooked, or provided with an extension or attachment bent or crooked, in a direction generally inward or toward and over the finger-beam and platform, a compensating connection or flexible and longitudinally self-adjusting pitman and its jointed attachments connected with the rake-arm and with the bent rake-post eccentrically to the crown-wheel, and links connecting the reel-arms with said bent rake-post, whereby the reel-arms are caused to enter the standing grain, sweep it back to the cutters and deposit it upon the platform, and then rise and pass forward to resume their work, and the rake-teeth are brought down so as to move over and upon the platform to sweep off the grain, and then rise and pass round to the starting-point simply by the control exercised over the arms by reason of the different centers about which they revolve.

The object of the next part of our invention is to impart differential movements to the rake and reel arms, or to cause the reel-arms to descend and strike into the standing grain well in advance of the cutters, while the rake-head descends to its work close to the platform, and much more abruptly than do the reel-arms, thus avoiding the tangling of the grain in the rake teeth; and under this head our improvements consist—

Sixth, in the combination of a crown-wheel or revolving disk supported at the inner front corner of the platform by a rake-post, which rake-post, above the crown-wheel, or an extension or attachment thereof, is bent or crooked toward the platform, or in a direction at first generally inward and upward, and then forward and upward, a rake-arm and reel-arms pivoted to the crown-wheel remote from its center, a compensating connection, both flexible and variable in length, connecting the rake-arm with the rake-post intermediate its upper end or forwardly-projecting portion and the crown-wheel, and so as to turn about said post eccentrically to the crown-wheel, and link-rods connecting the reel-arms with the upper end or forwardly-extending part of the bent rake-post or attachment thereto, whereby both the reel-beaters and rake are governed in their revolutions from two centers, the one common to both the rake and reel arms and the others differing, but both eccentric to the common center of revolution, and are caused to rise and pass round from the rear of the platform out of the way or free from obstruction, the reel-arms then caused to reach well out and strike into the standing grain and sweep it back and then clear the platform, while the rake descends later or closer to the cutters and abruptly into the space cleared of grain by the next preceding reel-beater preparatory to sweeping the platform.

The above improvements and other and minor features of our invention will hereinafter specifically be designated by the claims.

In the accompanying drawings so much only of a harvester is represented as we deem necessary to fully illustrate our invention, all our improvements being shown as embodied in a single machine in the best way now known to us, with slight modifications of parts. Obviously, however, some of our improvements may be used without the others—that is to say, less than the complete invention may be used advantageously, as, for instance, by the employment of some material features in connection with machines in other respects unlike that shown and hereinafter particularly described.

In practice our improvements are used in connection with or engrafted upon any suitable and fully-organized harvesting-machine of the present day, and the parts omitted from the drawings, and of which no description is hereinafter given, are unnecessary to a full understanding of our invention, in which a rake and reel carrying crown-wheel or other suitable revolving rake and reel support, A, is mounted so as to rotate freely about an axis, vertical, or substantially so, slightly in advance of the finger-beam, and over, or nearly over, its heel end and at the inner front corner of the platform. A rake-post, B, the lower vertical portion of which constitutes the support and axis of revolution of the crown-wheel, is suitably mounted in the proper position relatively to the finger-beam and platform C. Any suitable stand or bracket, A', serves to mount the rake-post and hold it in a fixed or rigid position, and the crown-wheel hub or its sleeve-bearing is prevented from moving vertically by suitable means.

The rake-post, above the crown-wheel or equivalent revolving rake-carrier, is bent or crooked, or it may have an extension or an attachment of suitable kind to serve as the mechanical equivalent of the rake-post, made in one piece or of a single rod, as shown by the drawings, and as we prefer, and by means of which we are enabled to give the rake the proper movements and cause it to sweep the platform without employing a cam or any toothed gearing, as will fully be explained, simply by revolving the rake about two points or centers and making the attachment or connection between the rake and one of the said centers self-adjustable, to compensate for variations in the distance between the said center or point about which the rake revolves in a differential path and the point on the rake-arm to which the said compensating connection is secured.

We attain the object sought in the manner and by the means now to be described.

The rake-post, from a point just above the crown-wheel, bends or crooks in a direction generally inward or toward and over the platform and finger-beam. More particularly described, the rake-post extends inward and slightly backward in about a horizontal direction between the points 1 and 2, and thence upward at an angle of, say, forty-five degrees, or a little less, and with the same backward inclination, or thereabout, as before, to or near the point 3. From the point 3, or a little distance below this point, the rake-post might terminate, so far as the rake alone is considered, or the functions of controlling the movements of the rake by the post are concerned; but were the post so terminated the links connecting the reel-arms with the post would necessarily be joined with that part of the post which is connected with the rake-arm, instead of in the preferable manner hereinafter described, and constituting an important feature of our invention; and an inferior operation, considering the work of reeling, or of reeling and raking, as a whole, would be the result of cutting short the rake-post at or near the point 3, and connecting the reel-arms to the post, so as to describe the same, or substantially the same, path as the rake or rakes instead of a different one, as will hereinafter fully appear.

A rake-arm, D, is jointed so as to play vertically by a pivot and lugs, or in other suitable way, to the crown-wheel near its edge or remote from its center, and a rake-head, D', is secured to the rake-arm in proper way. A bracket, d, at the heel end of the rake-arm serves to make the jointed connection with the crown-wheel by a horizontal pivot, as shown.

When the rake is in operation it rests at the heel end or by its securing-bracket upon the crown-wheel, which, in this instance, is provided with a slight ledge or low rib, d', to bring the support by the crown-wheel to the proper height to insure the contact of the rake-teeth with the platform when at work, and yet prevent the rake-arm from descending too low or sufficiently downward to throw the rake-teeth into an unsuitable position for proper work as about to sweep over the platform.

The compensating connection between the rake-arm and rake-post consists of the parts now to be described. A rod or pitman, E, is jointed at e, so as to be capable of flexing or yielding laterally, to a loose collar or turning hanger-bracket, E', on the inclined portion of the rake-post, between the points 2 and 3. The collar is capable of freely swinging around and upon the post, and is made in sections secured together by screws or bolts to facilitate adjustment and removal.

Cross-pins or other suitable stops above and below the collar prevent its movement up and down or endwise of the post. One of the bolts connecting the sections of the collar serves as the pivot which joins one end of the pitman to the collar by a nut-hanger or screw-coupling, P, for adjusting the pitman's length. The opposite end of the pitman is hooked or bent, and fits in an eye or socket in an eye-coupling or socket-piece, e', pivoted to a lug on a swinging bracket, F, on the rake-arm. This bracket is pivoted at f to lugs on a metallic securing-plate, F', fastened to the rake-arm.

To provide for the adjustment of the rake independently of the coupling P, as will hereinafter be explained, the eye-coupling or socket-piece $e'$ has two eyes or sockets, (and it may be made with more,) into either of which the pitman end may be fitted, and then prevented from accidental displacement by a cross-pin or split key. The coupling $e'$ is prevented from movement endwise of the arm or lug $f'$ of the swinging bracket by a cross-pin, split key, or equivalent means which will admit of ready separation of the parts and allow the eye-coupling to freely rock in a plane at or near about a right angle to that in which the bracket F moves on its hinged connection with the rake-arm.

An inward projection or short arm, $f^2$, at the inner or heel end of the swinging bracket serves as a stop to limit the play of the bracket in one direction—that in which it moves—to lengthen the compensating connection between the rake and post, and of which connection this bracket forms part, it will be seen.

A hole, (or preferably a series of holes,) $f^3$, in the front or outwardly-projecting part of the swinging bracket provides for connecting a spring, $F^2$, at one end to the bracket, so as to exert a constant strain on the bracket in an inward direction to bring its stop $f^2$ against the plate $F'$, or so as to give the bracket a tendency to swing inward and lengthen the compensating connection. A coiled spring is employed, one end being attached in suitable manner near the heel of the rake-arm, while the other end connects by a link with the bracket. In this instance the spring is hooked at its inner end to the rake-hinge pintle-bearing or pivot-socket.

By means of the series of holes the spring may be adjusted so as to vary its tension and compensate for loss of power by use, as it will be obvious that the farther the spring-link is adjusted from the pivot of the bracket the greater the power the spring will exert, owing to the increased leverage.

The bracket constituting the outer end of the compensating connection between the rake-post and rake-arm is mounted, it should be observed, on the rear side of the rake-arm, or on the side opposite that which comes in contact with and pushes against the grain. Entanglement of the grain in the joint between the bracket and rake-arm and the double joint $e'$, or duplex flexing connection between the pitman and bracket, is thus prevented. The bracket, moreover, swings in a plane at or near a right angle to the direction in which the rake-arm moves in rocking on its heel-pivot, and so the bracket, in its movements during the operation of the rake, plays horizontally, or nearly so, instead of rocking vertically. The latter movement would throw the bracket in part out from behind the arm and expose it to the grain, so as to become entangled with it, if not causing it to actually project into or take hold of the grain.

From the above description it will be seen that when the machine is in operation the crown-wheel, as it revolves about the vertical portion or the base of the stationary, bent, or crooked post, carries the rake forward once during each revolution to the point at which it begins to descend, which is just after having passed in front of the post, or soon after it crosses and continues to move away from or inside of a point which would be defined by a line drawn centrally through the crown-wheel hub, and at a right angle with the finger-beam, or in a plane transverse to said beam. At this time the compensating connection between the rake and post, even when elongated to its utmost, because too short for further movement of the rake in a direction which would cause its bracket-pivot or the point of attachment to the rake of the compensating connection, approaches nearer to the point on the rake-post with which this connection joins. The rake, consequently, is forced to accommodate itself in its further movements to the positions of the other parts by taking such a course of travel as will prevent binding, cramping, or breakage of parts; and this it does by dropping gradually downward to the working position, or that assumed when about to sweep the platform.

Figure 1:
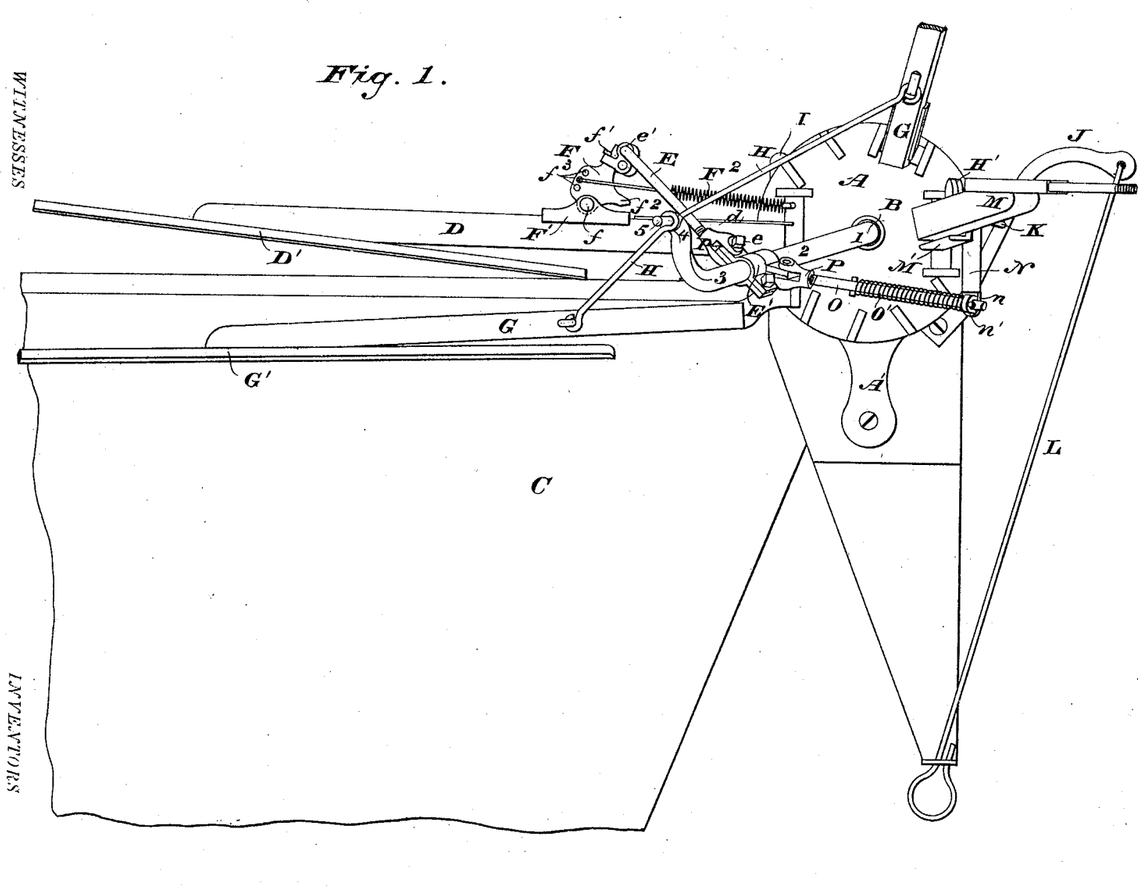
Figure 1 is a plan or top view with the rake unset or adjusted to be inoperative, and in the position it occupies when just about to pass over the platform without sweeping off the grain, some of the reel-arms being omitted, and a second rake represented as passing round to the front.
Figure 2:
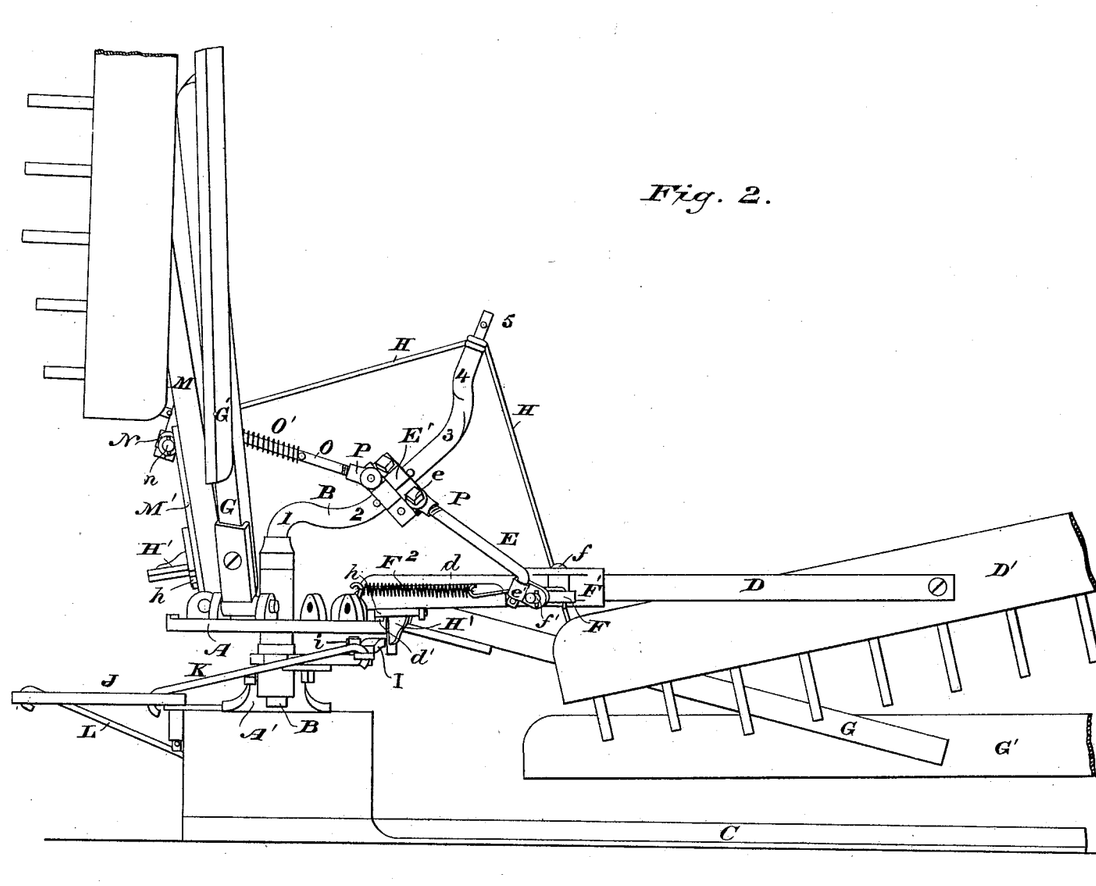
Fig. 2, a front elevation, showing the parts occupying the same positions as in Fig. 1.
Figures 3, 4:
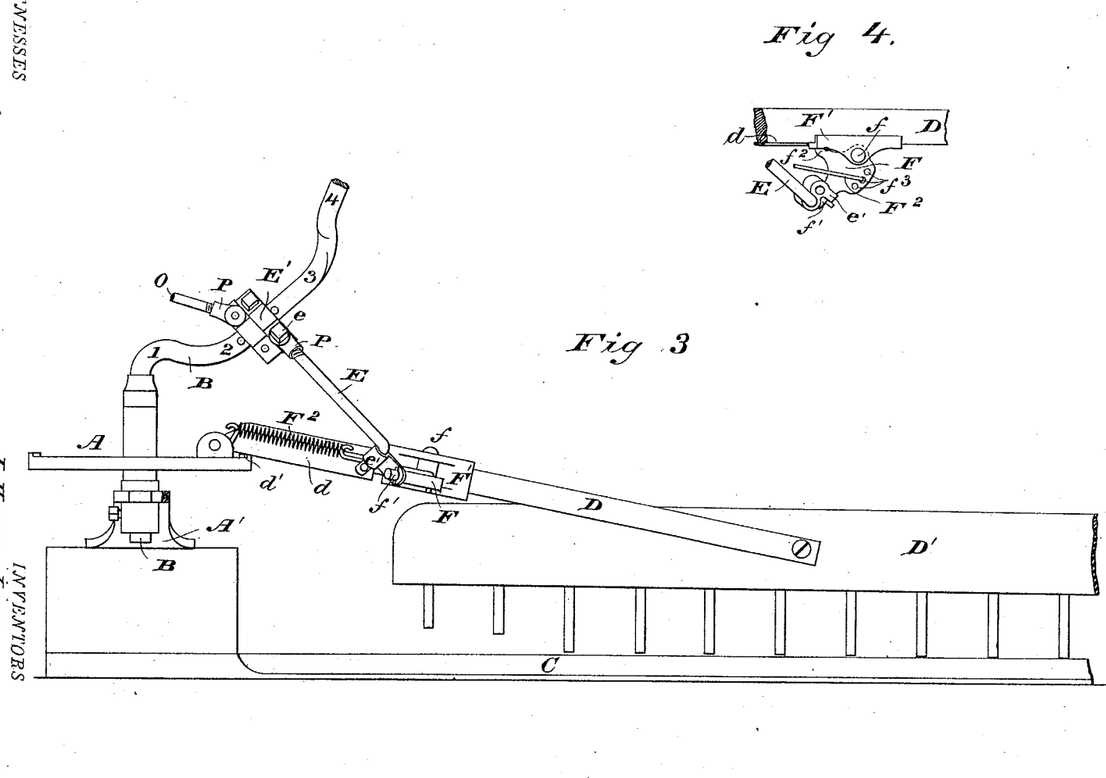
Fig. 3 is a front elevation, with some parts wholly omitted and others broken away, representing the rake as set and in the position it assumes after descending, and as about to pass across or over the platform with its teeth in contact therewith to sweep the grain therefrom.
Fig. 4, a plan or top view, representing, in part, the connections between the rake-arm and the rake-post in the positions assumed when the rake is about to sweep the platform, as in Fig. 3.
Figure 5:
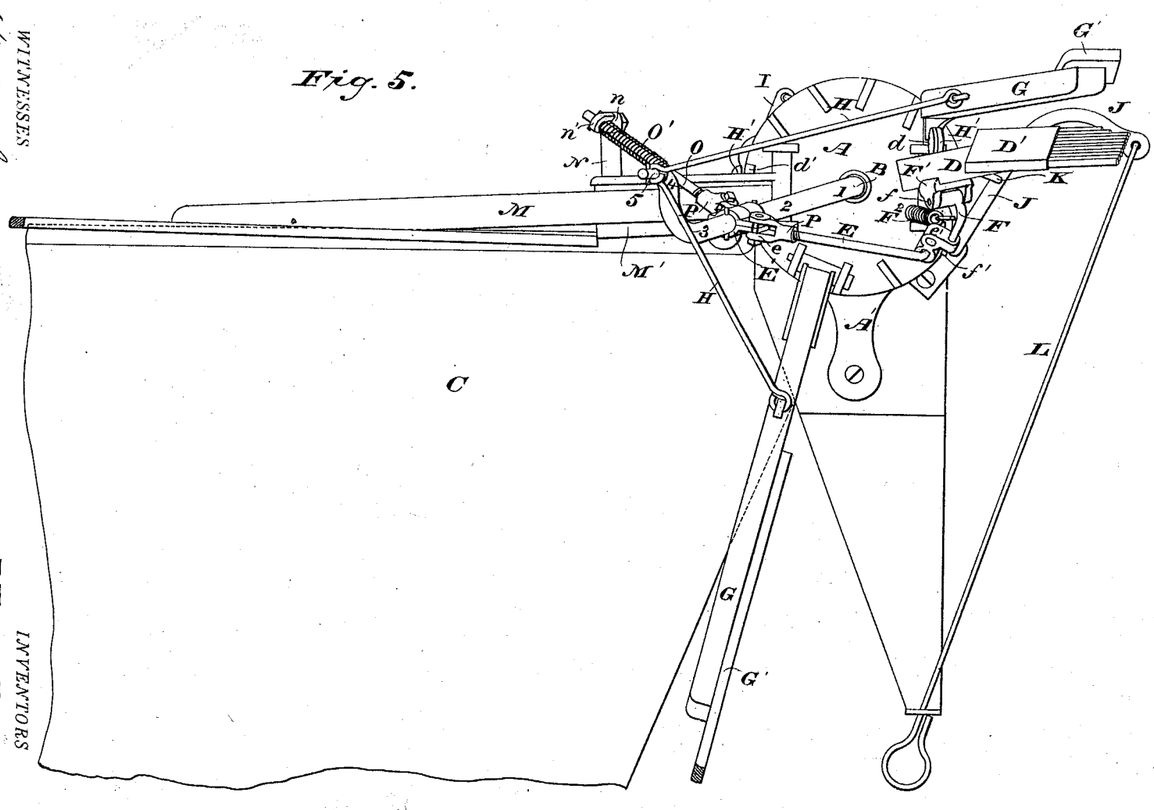
Fig. 5 is a view generally similar to Fig. 3, some of the parts being modified to represent mechanical changes.

The rake descends with sufficient slowness, or gradually enough to prevent any undue sudden strain or violent jerk on the parts, to the position it occupies immediately before assuming that shown by Fig. 3, and in which the rake-arm heel or securing-bracket rests on the crown-wheel, just outside of the hinged connection between the arm and wheel. Throughout this time the compensating connection between the post and rake is at its full length, which exceeds that necessary to present the points of the rake-teeth to the platform properly.

In practice we allow a margin of adjustment or give a slightly greater downward movement to the rake than is absolutely necessary to bring it into proper working position in advance of the cutters, so as to insure its descending low enough to work properly subsequently, and therefore, in assuming the position shown in Fig. 3, the rake rises slightly as its teeth touch the platform, thus somewhat shortening the compensating connection. As the rake sweeps the platform its connection with the rake-post first shortens and then lengthens, and by the time the rear edge of the platform is reached and the gavel swept off the connection has stretched to its utmost length, and the rake rises gradually and passes round to repeat the operation described.

A series of reel-arms, G, hinged to the crown-wheel or revolving disk, are caused to travel in a path varying from that of the rake, and so as to cause the bats or beaters $G'$ to reach out well into the standing grain, sweep it in quickly to the cutters, assume a position, in turn, parallel with and in advance of the finger-beam, clear a path or provide a space for the rake to descend in without obstruction from the standing grain, and press the cut grain back upon the platform to be swept off by the rake, which descends more abruptly or nearer to the cutters than the reels.

To give the most desirable movements, such as just described, to the reel-arms, the rake-post is abruptly extended forward or bent, as represented by the drawings, from or near the point 3 to the point 4, and then projects upward vertically, or nearly so, as at 5, a shoulder being provided at the base of the part 5, and to this part of the post the reel-arms are jointed by controlling rods or links H, which turn freely about the post and in staples, or their equivalents, on the arms.

The operation of the beaters and the advantages arising from the construction of parts as described will readily be understood by inspection of the drawings.

It will further be obvious that by employing the spring $F^2$ the rake is held down to the platform when at work, and its teeth are prevented from riding over the grain or jumping the platform at spots.

The peculiar means adopted by us to give the requisite compensation or self-adjustment both in length and flexibility to the connection between the rake-arm and rake-post, and at the same time providing for altering the range of movement or limiting the amount of automatic adjustment, as will presently be described, is one combination or form only of the numerous mechanical appliances which may be employed; and we do not wish to be understood as confining ourselves to the precise means herein represented and shown by the drawings as employed, the operation of which will readily be understood, for it will be seen that the inward swing of the bracket F serves to lengthen the connection, as would the straightening of a toggle-joint or lazy-tongs, for instance, while an outward swing or movement of the bracket, which would carry its stop-arm $f^2$ away from the plate F', shortens the connection by bringing closer together the points of attachment of the connection to the rake and to the post.

By shifting the pitman E from the outer eye in the coupling $e'$ to the inner one the connection is shortened slightly, and the rake is consequently caused to descend sooner and farther out from the cutters, and to leave the platform sooner than when the adjustment is as represented by the drawings, and the rake may thus be made to act also as a reel or beater, if it be desirable to have it so act, as in very heavy grain.

To enable the driver to control the rake or cause it to sweep the platform or not, we employ mechanism such as shown in the before-mentioned application of Jones, filed July 28, 1879, consisting of a gravity-dog, H, pivoted on the rake-arm, so that as the crown-wheel revolves and the rake-arm rises this stop will fall into a position to bring its nose or point $h$ between the rake-arm and the crown-wheel rib $d'$, and thus prevent the rake from descending to the platform.

A horizontally-swinging tripping-latch, I, beneath the crown-wheel, and retained in its normal or inoperative position by a spring, $i$, is controlled by a lever, J, link K, and rod or chain L.

When the rake is to be made to sweep the platform, a pull upon the rod L throws out the latch I in a position to be struck by a lateral arm or lug on the dog H, which is thus swung outward to remove its nose $h$ from the position necessary for it to occupy to prevent the rake-arm from descending so as to rest on the crown-wheel. This rake setting or controlling mechanism is not herein claimed.

By mounting the rake-arm D close to or upon the same pivot as the reel-arm next in advance of it, the rake follows so closely upon the reel as to avoid all possibility of its teeth becoming entangled with the grain, there being a clear space for it to descend into and pass onto the platform.

Figures 6, 7:
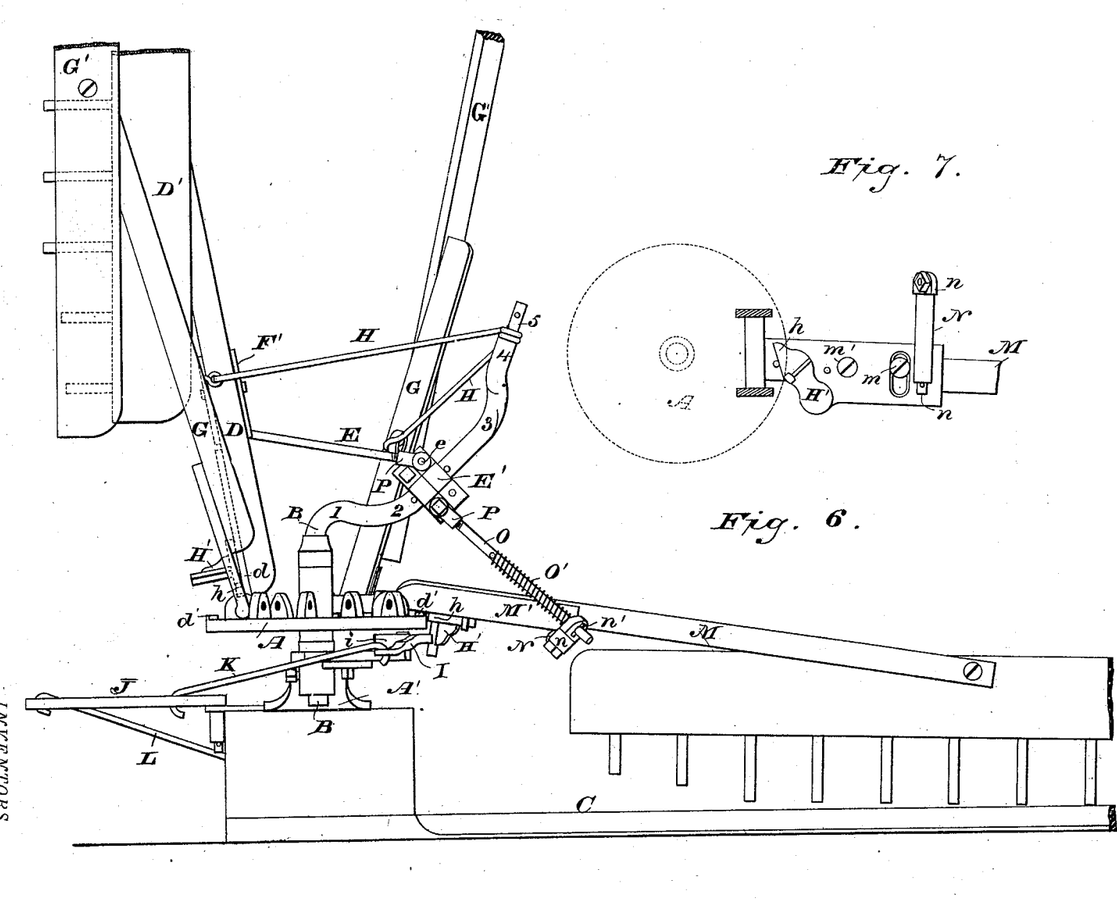
Fig. 6, a front elevation with the parts as in Fig. 5.
Fig. 7, an inverted plan or bottom view of a part of the rake-arm represented in Figs. 5 and 6, and showing the manner of attaching it to the crown-wheel.

As a modification of our improvements, we have shown a rake-arm, M, secured to a bracket, M', so as to be adjustable laterally therein, as clearly shown by Fig. 7, to cause the rake to descend soon or later, or strike out into the grain or descend close to the platform. By loosening the set-screw $m$ the rake-arm may be swung upon the pivot $m'$, and set by tightening the screw in its slot.

As a modification of the compensating connection between the rake-post and rake-arm, we have shown a sleeve bearing or socket, N, on the adjusting-bracket M', in which fits a turning eye-rod or rocking pivot-pin, $n$. In the eye of this rod is fitted an eye-coupling or swivel-pin, $n'$, to which is jointed, so as to slide or move endwise and turn freely, one end of the pitman O, which connects at its opposite end with the rake-post. A cross-pin at the end of the pitman prevents its withdrawal from the eye of the coupling $n'$, while a coiled spring, O', acts with a tendency to keep the pin up to its seat, or prevent endwise movement of the pitman.

The above-described modifications, while not claimed *per se*, may obviously be employed in lieu of the preferable rake supporting and controlling devices in the organization of the machine as a whole, or considering its operation both as a reel and rake, as the described operation of reeling and raking is identical in both constructions.

The pitmen which connect the rake-post and rake-arms are provided at their upper ends with screw-threads, by which they may be adjusted in length by screwing them in or out of the threaded couplings P, which connect them with the loose collars or hanger-brackets turning about the rake-post, as before described.

We do not claim, by themselves, any of the improvements shown and described in the before-recited sole application of J. Herva Jones, filed July 28, 1879, as the same were invented by him prior to the invention by us of the improvements hereinafter claimed. Therefore all such features as are common to both inventions, or substantially alike, are claimed by us only in combinations differing from those shown in the said sole invention of Jones, or in connection with additional features of our invention. Neither do we in this patent in any manner claim any of the improvements embraced in Letters Patent of the United States granted Daniel L. Emerson, dated September 2, 1879, No. 219,236.

We claim as of our invention—

1. The combination, substantially as hereinbefore set forth, in a harvester-rake having its movements controlled wholly from two centers or points of support, of the crown-wheel or other rake carrier or support revolving about an axis at or near the heel end of the finger-beam or inner front corner of the platform, the rake-post, or an extension or attachment thereof, which, above said crown-wheel, is bent or crooked inward, or in a direction generally toward and over the platform and finger-beam, the rake-arm hinged at its heel to said crown-wheel near its edge or remote from its center, having vertical play on its hinge-pivot and resting on or supported by the crown-wheel when at work, and the flexible self-compensating connection between the rake-arm and bent rake-post, consisting, essentially, of a bracket pivoted on the rake-arm, and swinging in a path at, or about at, a right angle with the plane of movement of the rake-arm about its heel-pivot, and a pitman doubly jointed at one end to the bracket and flexibly connected at its opposite end with the rake-post, about which it turns eccentrically to the crown-wheel, and, together with said wheel, serves to support and control the rake, thus dispensing with a cam or toothed gearing, for the purpose set forth.

2. The combination, substantially as hereinbefore set forth, in a harvester-rake supported and controlled wholly from two centers or points of support, of the rake-carrying crown-wheel, the rake-post, or an extension or attachment thereof, bent or crooked inward, the rake-arm jointed to the crown-wheel, and the flexing self-compensating connection between the rake-arm and post, adjustable in length, and consisting of the turning support on the rake-post, the pitman jointed thereto, and the bracket, to which the pitman is adjustably jointed, swinging on a pivot, $f$, on the rake-arm at, or about at, a right angle to the pivot, by which said arm is hinged to the crown-wheel, for the purpose set forth.

3. The combination of the rake-arm revolving about the crown-wheel axis, a swinging bracket on the rake-arm, a pivoted eye-coupling or socket-piece rocking on the bracket and transversely thereto, and the pitman adjustably connected with the said coupling at one end and having jointed connection at its opposite end with the bent rake-post, or an extension or attachment thereof, about which the pitman turns eccentrically to the crown-wheel, to give the proper movements to the rake throughout the adjustments, substantially as hereinbefore set forth.

4. The combination of the crown-wheel or revolving rake-support, the rake, the bent or crooked rake-post, or an extension or attachment thereof, the pitman turning about said rake-post, or attachment thereof, a swinging bracket by which said pitman is connected with the rake, and a contractive spring connected at its opposite ends at or near the rake-arm heel and to said bracket, substantially as and for the purpose hereinbefore set forth.

5. The combination, substantially as hereinbefore set forth, in a harvester-rake supported and controlled wholly from two centers or points of support, of a crown-wheel or revolving rake and reel support turning about an axis vertical, or nearly so, at the inner front corner of the platform, a series of rake and reel arms hinged to said crown-wheel remote from its center, a rake-post which, above the crown-wheel or revolving rake and reel support, is bent or crooked inward or toward and over the finger-beam and platform, a compensating connection or flexible and longitudinally self-adjusting pitman and its jointed attachments connected with the rake-arm and with the bent rake-post eccentrically to the crown-wheel, and jointed controlling rods or links connecting the reel-arms with the bent rake-post at points also eccentric to the crown-wheel, for the purpose described.

6. The combination, substantially as hereinbefore set forth, of the rake-post supported near the inner front corner of the platform, a crown-wheel or revolving rake and reel support turning about said post, which, above said crown-wheel, is bent or crooked, or provided with an attachment bent or crooked, at first toward and over the platform, or in a direction generally inward and upward, and then forward and upward, a rake-arm and reel-arms pivoted to the crown-wheel remote from its center, a compensating connection both flexible and variable in length between the rake-arm and that part of the rake-post intermediate the crown-wheel and its upper end or forwardly-projecting portion, and turning about said post eccentrically to the crown-wheel, and links or jointed controlling-rods connecting the reel-arms with the upper end or forwardly-extended part of the rake-post, for the purpose described.

7. The combination of the pitman of the compensating connection between the rake-post and rake-arm, the swinging bracket on the rake-arm connected with said pitman and provided with a series of holes, and the contractive spring adjustably connected at one end with said bracket and attached at its opposite end to or near the heel of the rake-arm, substantially as and for the purpose hereinbefore set forth.

8. The combination of the bent or crooked rake-post, the turning-collar thereon, the threaded coupling pivoted to said collar, the pitman screwed at one end into said coupling, the eye-coupling or socket-piece with which the opposite end of the pitman is connected, and the swinging bracket on the rake-arm, provided with the stop abutting against said arm to limit its inward movement, and to which bracket the socket-piece is jointed, these members being and operating substantially as hereinbefore set forth.

9. The combination of the rake-arm hinged to a crown-wheel or revolving support, and the swinging bracket pivoted on the rake-arm, and provided with a stop or arm, $f^2$, to limit its play, and a lug to which is jointed a pitman turning eccentrically to the crown-wheel, substantially as and for the purpose hereinbefore set forth.

10. The combination of the crown-wheel, the rake-carrying arm pivoted to said wheel remote from its center of revolution, a reel-carrying arm pivoted to the crown-wheel close to or by the same pivot which joins the rake-arm to the wheel, and controlling connections for said rake-arm and reel-arm revolving about different centers eccentrically to the crown-wheel, substantially as and for the purposes hereinbefore set forth.

In testimony whereof we have hereunto subscribed our names.

J. HERVA JONES.
RALPH EMERSON.

Witnesses:
JNO. W. HEPBURN,
RALPH EMERSON, Jr.